April 20, 1943.  A. A. DALKIN  2,317,034
PISTON RING FOR MIXING VALVES
Filed Aug. 10, 1942
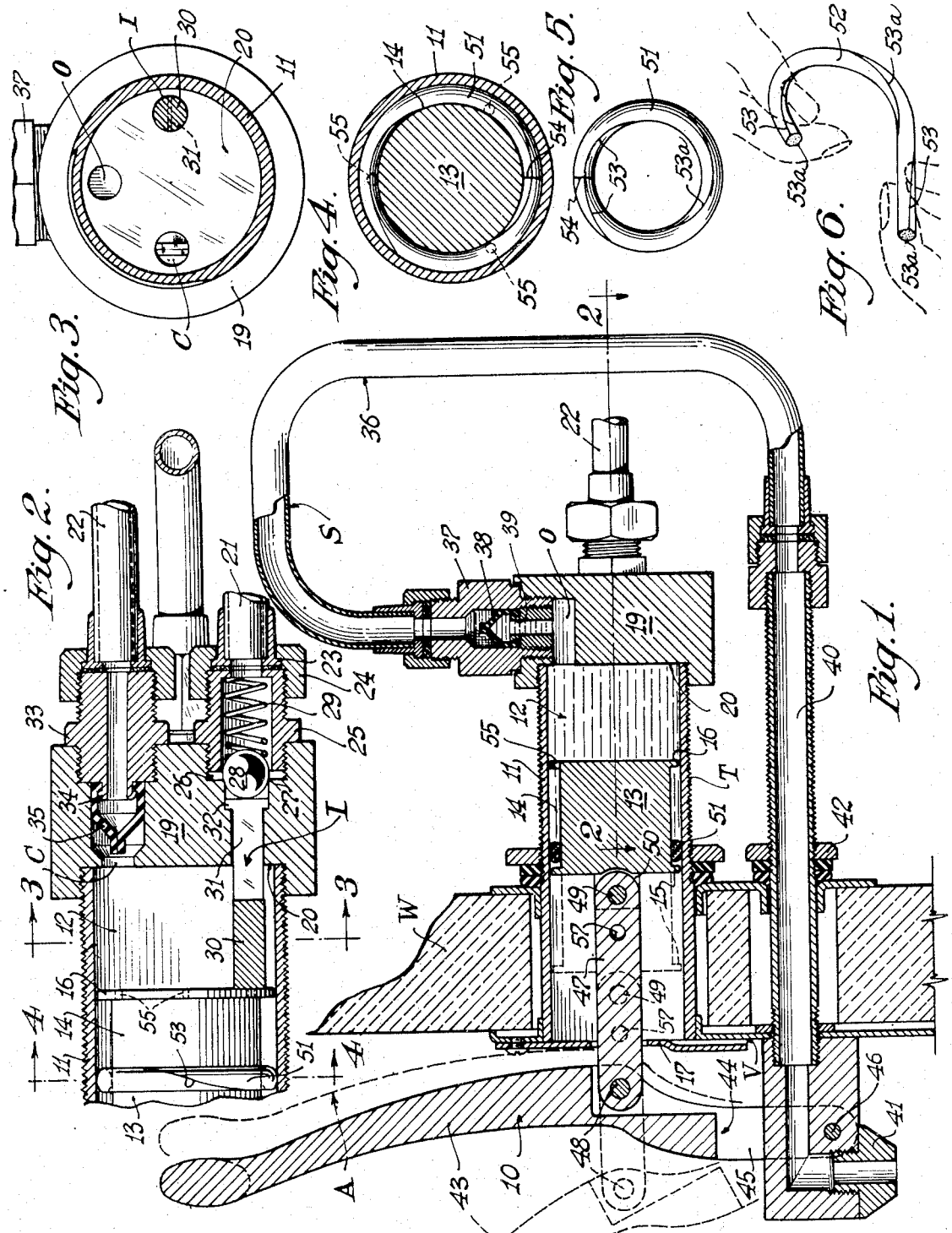
Albert A. Dalkin
INVENTOR.
BY Clarence E. Threedy
HIS ATTORNEY.

Patented Apr. 20, 1943

2,317,034

UNITED STATES PATENT OFFICE 2,317,034

PISTON RING FOR MIXING VALVES

Albert A. Dalkin, Chicago, Ill., assignor to A. Dalkin Co., Chicago, Ill., a corporation of Illinois Application August 10, 1942, Serial No. 454,256

2 Claims. (Cl. 309—23)

This invention relates to improvements in fluid displacement devices, such as pumps, and refers more particularly to improvements in a form of pump known as a mixing valve wherein two or more fluids are brought into intimate admixture by reciprocable action of a plunger or piston which reduces the pressure within a mixing chamber by movements in one direction to effect an influx of one fluid and, when moved in an opposite direction, actuates a valved connection to a pressure fluid line, thereby causing the injection of a fluid under pressure into the mixing chamber, and the two fluids being ejected as a result of the pressure existing in the chamber.

A further and more particular object is the provision in a mixing valve or other fluid displacement device, such as a pump for liquids or gases, of a novel piston structure characterized by the use of a cylindrical piston having an annular groove or channel cut around its side walls and a piston ring disposed in the groove and constructed of a resilient non-porous material, the ring rolling back and forth in the channeled part of the piston as the latter reciprocates in its cylinder.

A still further object is the provision in a mixing valve or fluid displacement device, of a piston ring in the form of an annulus of rubber or analogous resilient non-porous material, the annulus being twisted out of a normal condition of internal equilibrium about its length so as to roll smoothly between the cylindrical wall portion of a piston and a cylinder in which the piston works.

Other objects, advantages and novel aspects of the invention reside in certain details of construction as well as the cooperative relationship of the component parts of the illustrative embodiment described hereinafter in view of the annexed drawing, in which:

Fig. 1 is a vertical longitudinal section of the mixing valve;

Fig. 2 is a fragmentary horizontal section of the same as seen along line 2—2 in Fig. 1 and at a slightly enlarged scale with respect thereto;

Fig. 3 is a vertical cross section through the mixing chamber looking in the direction of line 3—3 in Fig. 2;

Fig. 4 is a vertical cross section through the pump cylinder and piston along line 4—4 of Fig. 2;

Fig. 5 is a side elevational view of a twisted piston ring embodied in the valve; and Fig. 6 is a perspective illustrating the twisting of the piston ring prior to the joining of its ends.

The present invention is an improvement over mixing valves of the type broadly shown and claimed in U. S. Patent No. 2,216,890. The improvements reside in the arrangement of fluid inlets to the mixing chamber and especially to the novel arrangement of a discharge exit of the mixing chamber to provide a liquid seal between the interior and exterior of the mixing chamber. A further improvement is found in the particular piston arrangement providing a rolling seal with an equalized tortional strain to accomplish a uniform rolling action of such seal when the piston is operated by hand.

Referring to the drawing the improved mixing valve is generally indicated at 10 and comprises a cylinder 11 providing a chamber 12 within which is disposed a piston 13 provided with a wide cylindrical channel or groove 14 extending about the cylindrical wall portion thereof and forming peripheral flanges 15 and 16 at the opposite axial ends thereof, which flanges are spaced slightly from the interior surface of the cylinder to permit an influx of liquid or air, as the case may be, into the groove 14.

The cylinder 11 has an escutcheon plate 17 at its outer axial end which provides a flange adapted to support the cylinder at right angle to the wall W upon which it is mounted. The outer wall of the cylinder has threading T to receive a nut 18 for fastening the cylinder to the wall W.

The inner end of the cylinder 11 is closed off by a block or fitting 19 which is recessed on one side 20, the annular wall of which recess has an inside thread which screws upon the threading T. In this fitting 19 is formed a plurality of ports, one I of which provides an inlet for air or liquid from a pressure feed line 21. Another port C provides an inlet for a liquid or powdered concentrate from a conduit 22 which is supplied by a storage compartment (not shown). Each of the ports I and C are arranged in a horizontal plane at the horizontal axis of the block 19, while a third port O is arranged on the vertical axis of the block 19 closely adjacent the upper area of the mixing chamber 12 to which it is exposed and to provide an outlet for fluid mixed in the chamber.

The pressure feed line 21 is suitably flanged as at 23 for connection by a cap nut 24 to a coupling sleeve 25. The block 19 is recessed as at 26 to provide a valve seat 27 coaxially with the port I. A ball 28 provides a valve closure and has a spring 29 arranged within the coupling sleeve 25 to press the ball against the seat 27, blocking passage of fluid from the pressure line 21 into and through the port I. A valve operating plunger 30 is arranged for sliding movement in the port I and has an elongated slit 31 formed along its long axis and fully across the diameter of the plunger to permit passage of fluid through the port I while the plunger is arranged therein. This plunger extends beyond the port I into the mixing chamber 12, with its end portion disposed to be engaged by the piston 13 (see Fig. 2). The opposite end of the plunger is flanged as at 32 so as to limit movement of the plunger in the direction of the chamber 12 and bears against the ball 28 so as to unseat the latter when the piston 13 is moved (to the right, Fig. 2) against the plunger 30, thereby permitting the fluid of line 21 to surge into the chamber 12.

The conduit 22 is connected to a sleeve 33 in the same manner as was the line 21 and is suitably attached to the block 19 by the coupling sleeve 33, the inner end of which has a nipple 34 formed thereon to receive the internal flange of a rubber flap valve 35. This flap valve 35 is so arranged as to permit passage of the liquid or substance within the conductor 22 in a direction toward the mixing chamber 12 when the pressure within the latter is reduced below that of the normal pressure within the conductor 22. This valve 35 also prevents retrograde movement of substance from the chamber 12 into the conductor 22 when the pressure within the chamber is increased above normal pressure in a manner later to be explained.

The outlet from the chamber 12 is through the port O at the highest point within the chamber 12 where air or gases normally collect, thus assuring against air pockets forming in the mixing chamber to reduce its capacity for a specific and predetermined volume of substance to be mixed. This outlet has connection with a conductor tube 36 by means of a coupling sleeve 37 extending straight up from the high point of the fitting 19. A flap valve 38 is arranged within the sleeve 37 on a nipple 39 in such a manner as to permit ejection of fluid from the chamber 12 but acting as a check valve to prevent influx of substance therethrough toward the mixing chamber 12.

The tube 36 extends upwardly out of the coupling sleeve 37 and then is arched to provide a siphon arrangement S feeding into a horizontal reach of tubing 40 terminating into a spigot 41 which directs the flow from the tubing 40 downwardly into any suitable receptacle, such as a drinking glass (not shown).

The spigot 41 is held against the escutcheon plate 17 by the tube 40 which in turn is fastened by means of a nut 42 to the inner face of the wall W to firmly support the spigot 41 and tube 40 upon the wall W. A handle 43 having a yoked lower portion 44 to provide a pair of arms 45 straddling the spigot 41 is pivotally arranged as at 46 upon the spigot for swinging movement as shown. A link 47 having one end pivotally connected as at 48 to the handle 43 extends through an opening formed in the escutcheon plate 17 along the axis of the cylinder 11 and is pivotally connected at its inner end 49 to a split boss 50 formed on the front face of the piston 13. Thus, the piston 13 is reciprocable within the cylinder 11 by a manually operable handle 43 for the purpose of operating the valve 10.

Th novel piston ring, as shown in Fig. 5, comprises a ring or annulus 51 of rubber or other resilient, non-porous material. The ring is preferably cylindrical in cross section as shown in Fig. 6, and a peculiarity of its structure resides in the fact that if an attempt were made to use such a ring as it would come from a casting mold, for example, and an attempt were made to roll this ring on a cylindrical surface, such as that of the channel 14 of the piston, the ring would not roll smoothly but would make intermittent jumps along the cylindrical surface after being rolled short distances, the reason being that the ring cast in the customary manner is possessed of a normally stabilized resiliency or internal equilibrium, and when an effort is made to roll the ring on a cylindrical surface as aforesaid, this condition of stability or equilibrium is distributed and, as soon as the ring is moved far enough to turn it partly inside out, the tension resulting from this disturbance causes the ring to make a sudden movement, turning it completely inside out and thus restoring it to its normal condition of equilibrium.

As a result of the foregoing peculiarity of a ring made in the familiar manner, that is to say, of a homogenous structure and uniform cross section with what is termed for convenience herein a "balanced internal tension," the operation of a pump employing such a ring would be jerky and otherwise unsatisfactory because of a lack of uniformity in the rolling movements of the ring, with a consequent inconvenience in wear and lack of uniformity in sailing action.

The improved piston ring overcomes the foregoing peculiarities of the rubber ring and the several objections thereto, by arranging to twist the ring out of its normal condition of equilibrium in consequence of which the tendency of the ring to jump or turn quickly inside out after it has been rolled a short distance is entirely overcome.

The ring 51 may be made from an elongated strip 52 of rubber of approximately circular cross section, such strips being commonly formed in a mold which leaves a slight bead 53 and 53a along opposite sides of the strip where the two halves of the mold meet. In its normal, stable condition the rubber strip would lie with the beads or fringe 53 and 53a extending in parallelism along opposite sides thereof.

In accordance with the invention, the rubber strip, as shown in Fig. 6, is twisted about its long axis through 360 degrees so that the ends of the flanges 53 and 53a at opposite ends of the strip are in alignment, whereupon the ends of the strip are joined by any suitable means, for example, a strong rubber cement, the ring then appearing as in Fig. 5 wherein the ends of the bead 53 or fringe along one side of the strip are shown to meet at the joint 54.

It will be understood that the provision of a fringe or bead portions 53—53a is not essential to the success of the twisted piston ring, the same being merely an incident of the customary and usual method in manufacturing flexible rubber rods or strips of the class described, the matter of describing the method of twisting the rubber being greatly facilitated by reference to this fringe and the fact that the corresponding ends of each bead or fringe on opposite sides of the strip are brought together, when the ends of the strip are joined, as a result of twisting the strip completely around. In general, and disregarding the fringe or bead, the broad object of this part of the invention is satisfied by any amount of twisting around the long axis of the rubber strip prior to joining the ends thereof or by any method of casting or molding the ring as an entirety with a sufficient internal strain to resist the tendency of the ring to flip itself inside out when it has been rolled a short distance on the cylinder.

When the ring is applied to the piston 13, as in Figs. 1 and 2, the diameter of the ring is sufficient so that it will be compressed into the elliptical cross section there shown, to provide an effective seal between the bottom of the channel 14 and the cylinder wall.

*Operation*

In the operation of the illustrative device, the position of Figs. 1 and 2 may be assumed as normal. The attendant grasps the handle 43 and pushes the latter inwardly to the position A and through link 47 urges the piston 13 against the plunger 30 to unseat the ball 28 permitting an influx of liquid under pressure. This influx of liquid into the now foreshortened mixing chamber 12 is a surge or rush of fluid which flushes the chamber 12 and eventually completely fills the foreshortened chamber with liquid, thus displacing all air from the chamber through the outlet O. The liquid contents of the chamber 12 is then of a predetermined volume as measured by the size of the foreshortened chamber. Upon release of the handle the spring 29 will reseat the ball 28 and force the flange 32 of the plunger 30 against the adjacent shoulder formation in the block 19, thereby causing the opposite free end of the plunger to urge the piston 13 and handle 43 into normal condition. This slight movement of the piston does not materially affect the pressure within the chamber 12 by reason of the fact that a certain amount of liquid is disposed in the channel 14 on the chamber side of the piston ring 51, a series of ports 55 being formed in the flange 16 to communicate such area of the channel 14 with the chamber 12 and to permit of ready displacement of fluid in such area when the piston ring 51 rolls along the channel 14 to reduce space on the chamber side thereof.

The attendant then grasps the handle 43 and withdraws the same (toward the left) into the position B shown in dotted lines, Fig. 1, thus retracting the piston 13 into the dotted line position. During such movement of the piston, the ring 40 will roll along the cylindrical bottom of the channel or groove 14 toward the flange 16 engaging the same by the time the piston has made its full retractive stroke. It will be noted that the forward end of the cylinder is exposed to atmospheric pressure through a vent V formed in the escutcheon plate 17, thus relieving any pressure on the front side of the piston. Such retraction of the piston reduces the pressure in the mixing chamber 12 and in consequence draws the liquid or substance in the conduit 22 into the chamber 12 until the reduced pressure therein has become equalized to a normal atmospheric pressure such as exists in the conduit 22.

The present mixing valve 10 finds its widest adaptability in beverage mixing devices wherein a concentrate or syrup is used to give a certain flavor to beverages while carbonated water is used to complete the beverage. However, the present invention contemplates a wider use in which a predetermined mixture of a concentrate and a solvent is required, such, for instance, as in a soap dispenser in which a highly volatile soap concentrate or even a finely pulverized soap powder is fed through the conduit 22 while a solvent, such as water, under pressure, is supplied through the pressure line 21 so as to dispense a predetermined amount of ready-to-lather liquid soap. For the purpose of better elucidating the novel features and advantages of my improved structure, I will explain the functions of the mixing valve when a syrup is used in the conduit 22.

The pressure in the mixing chamber 12 being reduced below that of the fluid in conduit 22, a predetermined amount of syrup will be drawn into the chamber 12 to displace the vacuum caused by the movement of the piston. The volume of syrup to be used is determined by the blanked area caused by the enlargement of the mixing chamber. It will be noted that there is a tapped hole 57 formed in the link 47 into which a stud screw (not shown) may be threaded to limit the withdrawal of the piston 13 to a shorter stroke, thereby cutting down the volume of syrup to be drawn into the chamber, as for instance, when a smaller drink is desired.

The chamber already containing a predetermined volume of charged water, renders the incoming syrup less viscous, thus assuring against a coating of such syrup on the inner wall of the cylinder. The pre-mix thus created is then ready for discharge through the port O which is accomplished by the attendant, who, after feeling the release of pressure on the handle 43, now pushes the latter back toward position A. The pre-mix of syrup and water is thereby forced up through the siphon jet S into the tube 36 for gravitation to and through the spigot 41 into a suitable receptacle (not shown). After the handle 43 passes the normal upright position and is moved into position A the piston 13 again engages the plunger 30, pushing the latter to the right (Fig. 2), displacing the ball 28 from its seat 27, permitting water under pressure to surge into the chamber and up through the check valve 38 and siphon jet S. This flow of water is usually continued until the receptacle receiving the beverage is filled, which requires several times the volume of syrup. For this reason the additional clear water surging through the chamber 12 and tubes 36—40 as well as spigot 41 flushes out the line and leaves the chamber 12 filled with water and ready for the next charge of syrup concentrate.

It is apparent that the efficiency of the sealing means or piston ring 51 is very important in the operation of such a device, for the syrup from conduit 22 must frequently be displaced from a storage place at some distance from the valve 10 and the amount of syrup drawn into the chamber 12 must be more or less carefully measured in mixing fountain drinks. In addition, the mixing of the liquid or fluid under pressure, that is, the carbonated water with the syrup, must be as complete as possible and the gas in the water must not be allowed to escape through the cylinder around the piston ring. Thus, the sealing of the piston must be as complete as possible without being elaborate as to construction or expensive as to cost and maintenance. The novel twisted rubber ring working in the groove in the piston meets all of the foregoing requirements.

By maintaining the mixing chamber 12 full of water at all times and permitting such water to pass through the ports 55 into contact with the rolling piston ring 51, the latter is at all times properly wetted to provide a proper seal. Also the wetting by the less viscous liquid prevents the tacky concentrate from becoming sticky and hence permits of a smooth rolling action by the piston ring.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A piston ring adapted to roll in sealing engagement between a piston and cylinder, said ring being made of rubber in which a torsional strain has been set up to destroy the tendency of the rubber ring to assume a normal position of equilibrium when rolled on a cylindrical surface frictionally embraced by the ring.

2. A piston ring adapted to roll in sealing engagement between the cylindrical wall portions of an interfitting piston and cylinder, said ring being formed of a resilient non-porous material of approximately uniform cross section and homogenous mass in which there has been set up a torsional strain acting in a direction about the long axis of the ring to provide a balanced internal condition of resiliency within the ring which will permit the same to roll with uniform movement on a cylindrical surface frictionally engaged thereby.

ALBERT A. DALKIN.